United States Patent [19]
Yamazaki

[11] Patent Number: 5,923,855
[45] Date of Patent: Jul. 13, 1999

[54] MULTI-PROCESSOR SYSTEM AND METHOD FOR SYNCHRONIZING AMONG PROCESSORS WITH CACHE MEMORY HAVING RESET STATE, INVALID STATE, AND VALID STATE

[75] Inventor: Takeshi Yamazaki, Tokyo, Japan

[73] Assignee: NEC Corporation, Tokyo, Japan

[21] Appl. No.: 08/692,346

[22] Filed: Aug. 5, 1996

[30] Foreign Application Priority Data

Aug. 10, 1995 [JP] Japan ................................. 7-204148

[51] Int. Cl.⁶ .......................... G06F 12/08; G06F 15/163
[52] U.S. Cl. ............................. 395/200.78; 395/200.43; 395/553; 711/144
[58] Field of Search ........................... 395/200.3, 200.43, 395/200.46, 200.78, 800.01, 551, 553; 711/141, 144, 166

[56] References Cited

U.S. PATENT DOCUMENTS 5,680,576  10/1997  Laudon ................................. 711/145

FOREIGN PATENT DOCUMENTS 0 372 201  6/1990  European Pat. Off. .

OTHER PUBLICATIONS

Min, et al., "Design and Analysis of a Scalable Cache Coherence Scheme Based on Clocks and Timestamps", IEEE Transactions on Parallel and Distributed Systems, vol. 3, No. 1, Jan. 1992, pp. 25–44.

Japanese Office Action dated Sep. 16, 1998, with partial translation.

Choi. L. "A Compiler–Directed Cache Coherence Scheme with Improved Intertask Locality", Proceedings of Supercomputing '94, IEEE press, 1994.

Lucien M Censier, et al., "A New Solution to Coherence Problems in Multicache Systems", IEEE Transactions on Computers, vol. C–27, Dec. 12, 1978.

European Search Report dated Dec. 22, 1997.

*Primary Examiner*—Dung C. Dinh
*Attorney, Agent, or Firm*—McGinn & Gibb,P.C.

[57] ABSTRACT

In a multi-processor system including a plurality of processing units each having a cache memory, the processing units each include a synchronization counter for indicating a present synchronization state of the respective processing unit, and a cache state table for holding information regarding the respective entries of the cache memory. The cache state table includes a cache state and a cache synchronization count. The cache state holds the respective cache state used in a cache protocol. The cache synchronization count holds a value of the synchronization counter when an entry is loaded. A cache protocol in the multi-processor system is simplified to realize a high-speed processing.

20 Claims, 5 Drawing Sheets

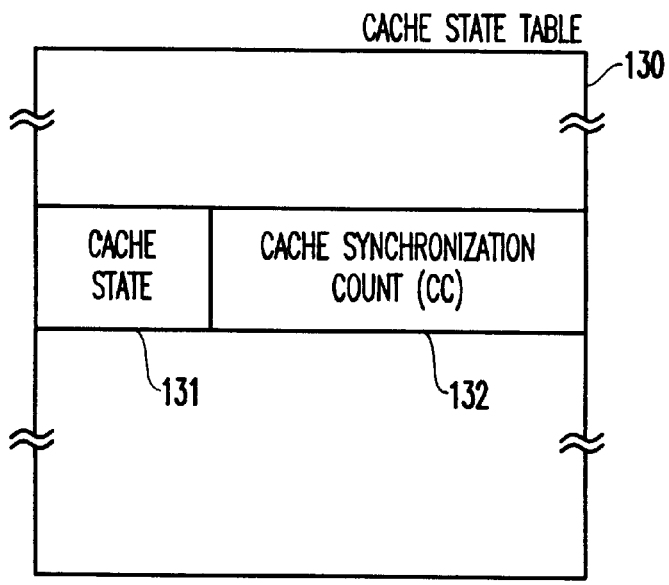
FIG.3
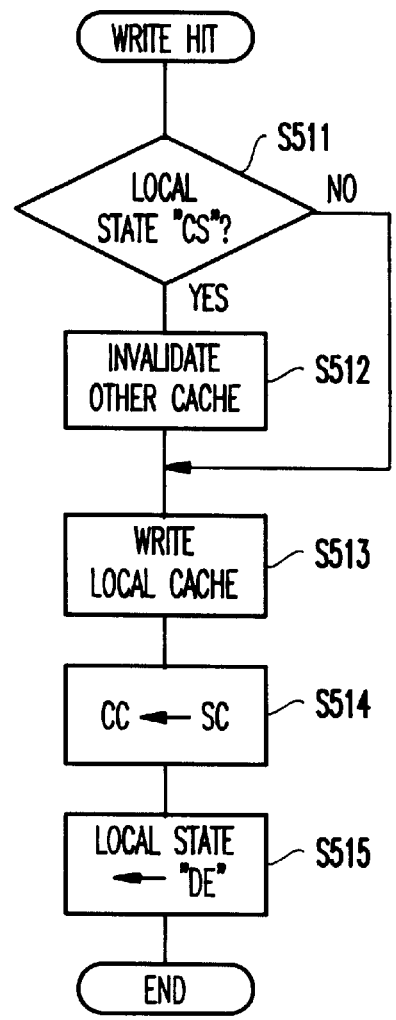
FIG.5
| CACHE STATE | MEANING |
|---|---|
| R | RESET |
| I | INVALID |
| CE | CLEAN EXCLUSIVE |
| CS | CLEAN SHARED |
| DE | DIRTY EXCLUSIVE |
FIG.4

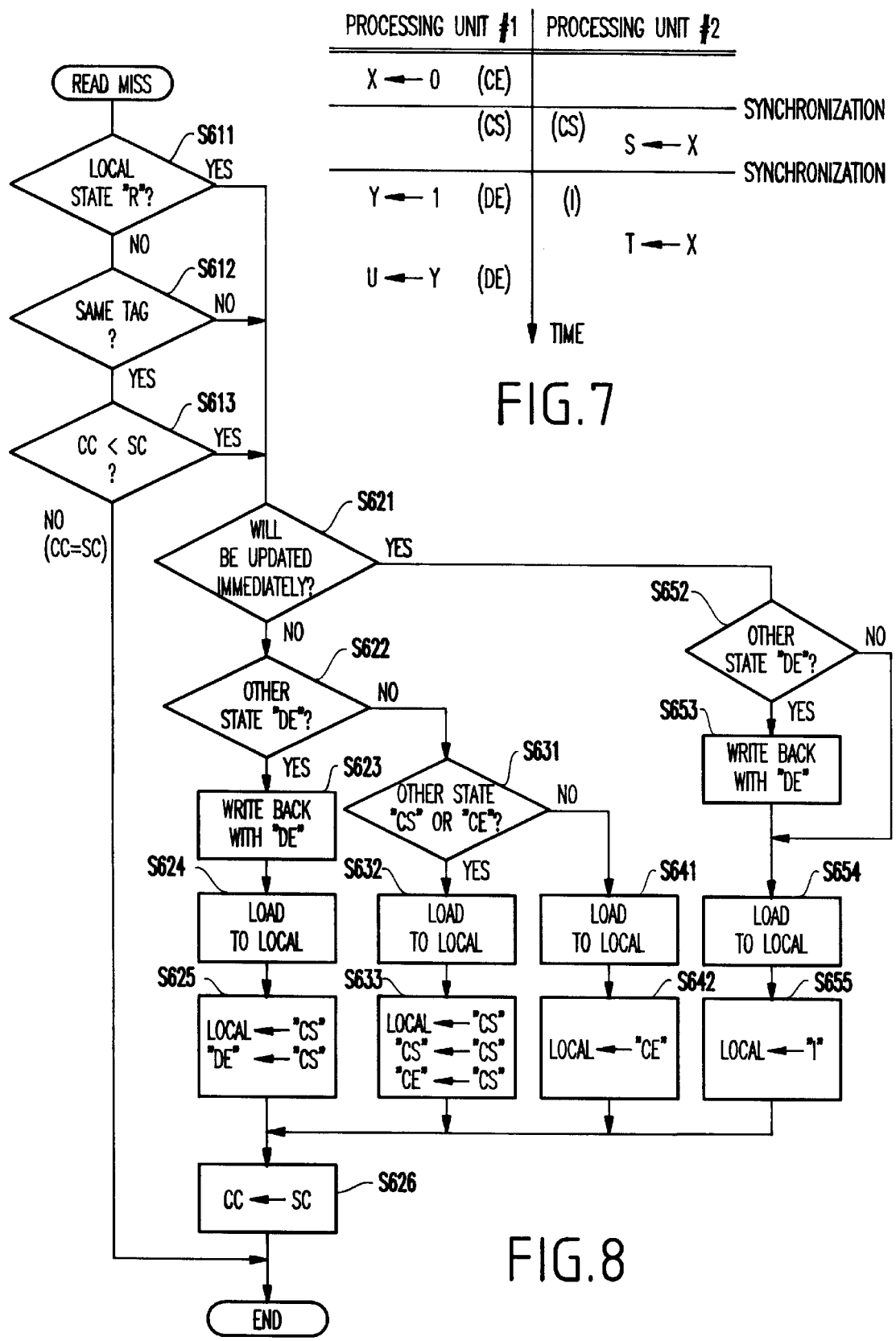

MULTI-PROCESSOR SYSTEM AND METHOD FOR SYNCHRONIZING AMONG PROCESSORS WITH CACHE MEMORY HAVING RESET STATE, INVALID STATE, AND VALID STATE

BACKGROUND OF THE INVENTION

The present invention relates to a multi-processor system and a method for synchronizing among a plurality of processors, and more particularly to a multi-processor system and a method for synchronizing among a plurality of processors with a simplified cache protocol.

In a multi-processor system, when either the same data or adjacent data are repeatedly accessed, the access to a main memory is reduced by using data held in a cache memory. Thus, the limited bandwidth outside the processor is effectively utilized.

In a multi-processor system, when data of the same memory area is held in cache memories of different processors, if the data is updated by one processor of the multi-processor system, then the data should be updated in the cache memories of other processors of the multi-processor system to be consistent with the corresponding data in the other processors. If the data is not updated, a "cache consistency problem" occurs. In this case, all of the corresponding data in the system are updated. Otherwise, all of the corresponding data in the cache memories of the other processors will be invalid before updating. These protocols to maintain consistency with other cache memories are called "cache consistency protocols".

Even when any one of the above-described protocols is employed, either the update request or the invalidation request should be issued for a plurality of corresponding data which are physically separated from each other. This protocol is realized by issuing the request to all of the processors or specific processors. The specific processors are selected according to a table storing correspondence data between cache memories associated with the specific processors and data.

For example, if a variable "X" is shared by a processing unit #1 and a processing unit #2, then a cache memory state of the entry having the variable "X" is referred to as a "shared" state. At this time, when the variable "X" is written in the processing unit #1, the state of the corresponding entry of the processing unit #2 becomes an "invalid" state, and then the state of this entry of the processing unit #1 becomes an "update" state. With this operation, it is assured that the incorrect data is not read in the processing unit #2, and furthermore it is assured that the correct (e.g., most recent) value of the variable "X" is located in the cache memory of the processing unit #1. Then, when the variable "X" is subsequently read by the processing unit #2, after the entry of the cache memory of the processing unit #1 is again written into the shared memory, this entry is transferred to the cache memory of the processing unit #2, and then the state of the entries of both the processing units #1 and #2 becomes the "shared" state.

Such an operation is required so as to assure the data consistency in every entry. However, this conventional multi-processor system has a problem in that a total number of request transfer operations for the updating operation and the invalidation operation is increased. In particular, a serious problem may be caused when the respective processors are connected by the network.

A second problem is that, since a plurality of variables are usually included in a single entry, when a variable is updated, other variables are adversely affected. For example, the variable "Y" is included in the same entry as the above-described variable "X", when the variable "Y" is updated by the processing unit #1 under a "shared" state, the entry of the processing unit #2 is invalidated. Accordingly, the data of the variable "X" would also be deleted from the cache memory.

On the other hand, in parallel processing operations, if processing units are synchronized, then assuring cache states in real-time is not necessarily required.

SUMMARY OF THE INVENTION

In view of the foregoing problems of the conventional system, an object of the present invention is to simplify a cache protocol in a multi-processor system to realize a high-speed operation.

In a multi-processor system according to a first aspect of the present invention, a plurality of processing units and at least one memory module are connected by a network. Each of the processing units comprises a cache memory for storing a copy of the memory module and a state memory for storing a synchronization state of the cache memory. The cache memory is accessed if the synchronization state indicates a latest (e.g., most recent) state.

With the unique and unobvious structure of the present invention, a cache memory is controlled with a simplified cache protocol, and intermediate cache states are omitted.

BRIEF DESCRIPTION OF THE DRAWINGS

The above-mentioned and other objects, features and advantages of this invention will become more apparent by reference to the following detailed description of the invention taken in conjunction with the accompanying drawings in which:

FIG. 3 is a diagram showing a structural example of a cache state table 130 according to the present invention;

FIG. 4 is a table showing a definition of the cache state according to the present invention;

FIG. 5 is a flowchart of a write-hit operation according to an embodiment of the present invention;

FIG. 7 is a diagram showing a timing of the first embodiment of the present invention;

FIG. 8 is a flowchart of a read-miss operation according to a second embodiment of the present invention;

DETAILED DESCRIPTION OF THE PREFERRED EMBODIMENTS

A multi-processor system in accordance with preferred embodiments of the present invention will be described in detail with reference to the accompanying drawings.

Figure 1:
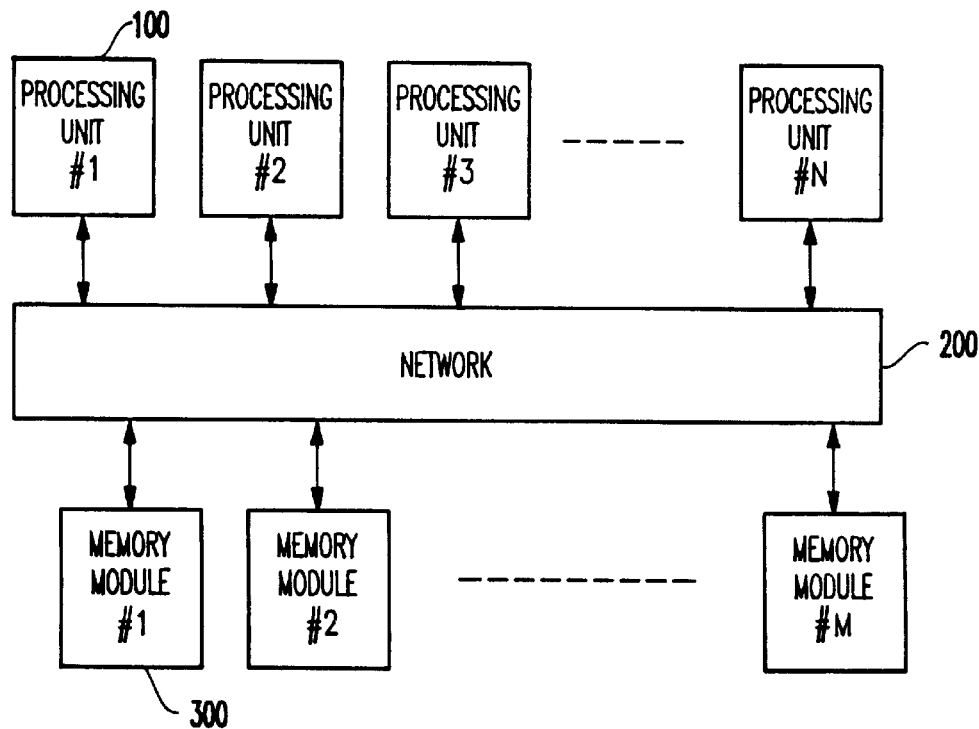
FIG. 1 is a block diagram showing the configuration of a multi-processor system according to an exemplary embodiment of the present invention.

Referring to FIG. 1, a multi-processor system according to an embodiment of the present invention comprises N (where N is an integer) processing units 100, M (where M is an integer and M can be less than, equal to, or greater than N according to the designer's requirements) memory modules 300, and a network 200 coupling together the processing units 100 and memory modules 300. The network 200 allows each processing unit 100 to communicate with any of the memory modules 300.

Figure 2:
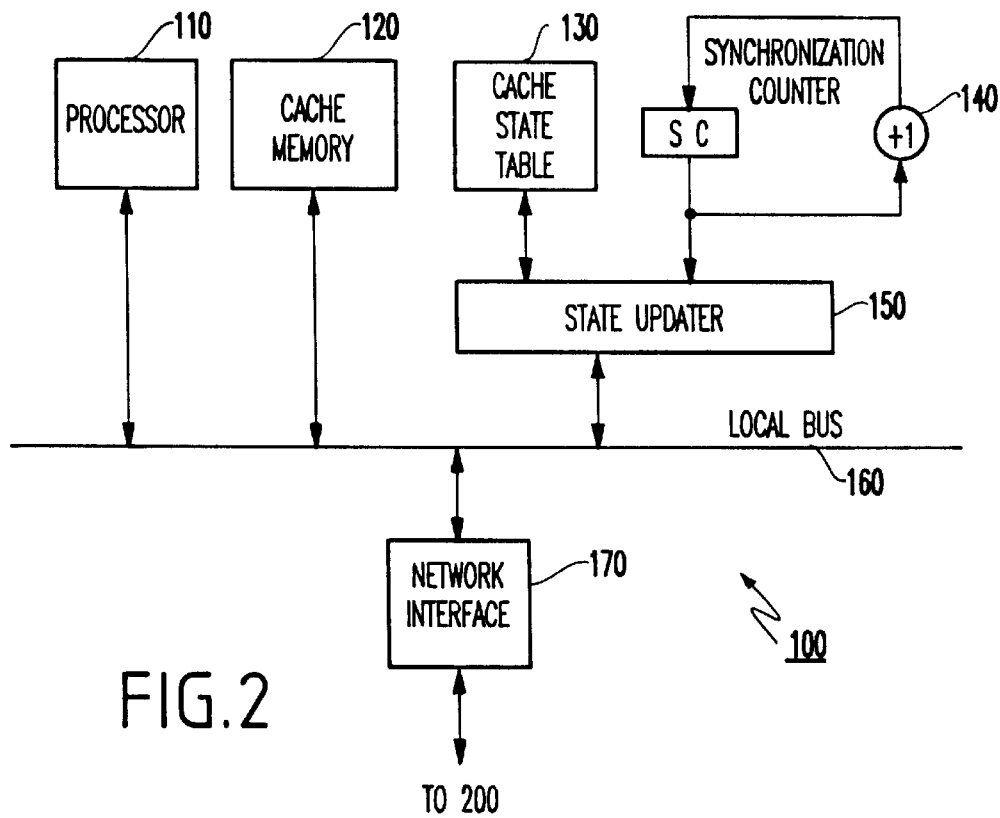
FIG. 2 is a block diagram showing the configuration of a processing unit 100 according to the present invention.

Referring to FIG. 2, the processing unit 100 in the multi-processor system of the present invention comprises a processor 110, a cache memory 120, a cache state table 130, a synchronization counter 140, a state updater 150, a local bus 160, and a network interface 170.

The processor 110 and the cache memory 120 are connected together via the local bus 160. The processing unit 100 is connected to the network 200 via the network interface 170. The cache state table 130 holds a cache state of each of the entries in a cache memory 120. The synchronization counter 140 counts every time a synchronization instruction (command) is executed. The cache state table 130 is updated by the state updater 150 connected to the local bus 160. The cache memory 120 includes a data memory (not shown) and an address tag memory (not shown) for managing addresses of data stored in the cache memory 120. A synchronization instruction is executed each time an entry in the cache memory 120 is modified by other processing units.

The synchronization counter 140 (abbreviated as "SC" in the drawings) is incremented every time the synchronization instruction is executed in the processor 110. The sync instruction is executed when an entry in the cache memory 120 is modified as discussed below. Thus, the sync counter 140 provides a value representing the present synchronization level of the processing unit 100.

Referring to FIG. 3, the cache state table 130 stores a cache state 131 and a cache synchronization count 132 (abbreviated as "CC" in the drawings) in correspondence with the respective entries of the cache memory 120. The cache state 131 indicates a state of a corresponding entry of the cache memory 130. The cache state 131 has various states such as an "invalid" state and a "shared" state, as described below. The cache synchronization count 132 shows a synchronization level of the data of the respective entry. Thus, a value of the synchronization counter 140 when the respective entry is loaded in the cache memory 120 is stored into the cache synchronization count 132.

Referring to FIG. 4, the cache memory 120 according to a first embodiment of the present invention has five kinds of states for representing the cache state.

An "R (Reset)" state indicates an initial state, and implies that since no data is loaded from the memory modules 300 after the system is initiated, the content of the data cannot be assured. An "I (Invalid)" state denotes an invalid state, and represents such an invalidated (e.g., updated) state after the valid data has been loaded once. A "CE (Clean Exclusive)" state denotes that only a specific cache memory 120 has a copy of the memory module 300, and also that the copy coincides with the content of the memory module 300. A "CS (Clean Shared)" state represents that other cache memories 120 also have copies of the memory modules 300, and also that these copies coincide with the content of the memory module 300. A "DE (Dirty Exclusive)" state indicates that only a specific cache memory 120 has a copy of the memory module 300, and also that this copy does not coincide with the content of the memory module 300.

When the system is initiated, each state of all entries has an "R" state. When the data is loaded from the memory module 300, each state of the respective entries becomes either the "CE" state or the "CS" state.

When a data writing instruction is issued from the processor 110 to the entry under either the "CE" state or the "CS" state, the state of this entry becomes the "DE" state. Generally, such a method of non-writing the data back to the memory module upon a write-hit is referred to as a "copy-back" or "write-back". When the data writing operation is issued by the processor 110 with respect to the entry under the "CS" state, other processors further invalidate the corresponding entry of their own cache memory, and the cache state 131 becomes the "I" state.

Generally, under the "I" state, the data is invalid and thus cannot be read in the conventional cache protocol. However, in accordance with the cache protocol of the present invention, the data is forcibly read in a predetermined case even under the "I" state.

Hereinbelow and referring to FIGS. 1–6, a cache protocol of the first embodiment in the multi-processor system of the present invention will now be described.

Referring to FIG. 5, a write operation on a cache-hit will be described. First, a cache state 131 of the cache memory 120 (e.g., of the local processor) is checked to determine whether the cache state 131 is under the "CS" state (step S511). If the cache state 131 of the cache memory is under the "CS" state, then other cache memories of the multi-processor system are invalidated (step S512). Each cache state 131 of the other cache memories becomes the "I" state after step S512.

In the processing unit 100 for the write operation on a cache-hit (e.g., a so-called "write-hit"), the data is written into the cache memory 120 (step S513). The cache synchronization count 132 of a corresponding entry in the cache state table 130 is set to have the value of the synchronization counter 140 (step S514). Finally, the cache state 131 becomes the "DE" state (step S515).

Figure 6:
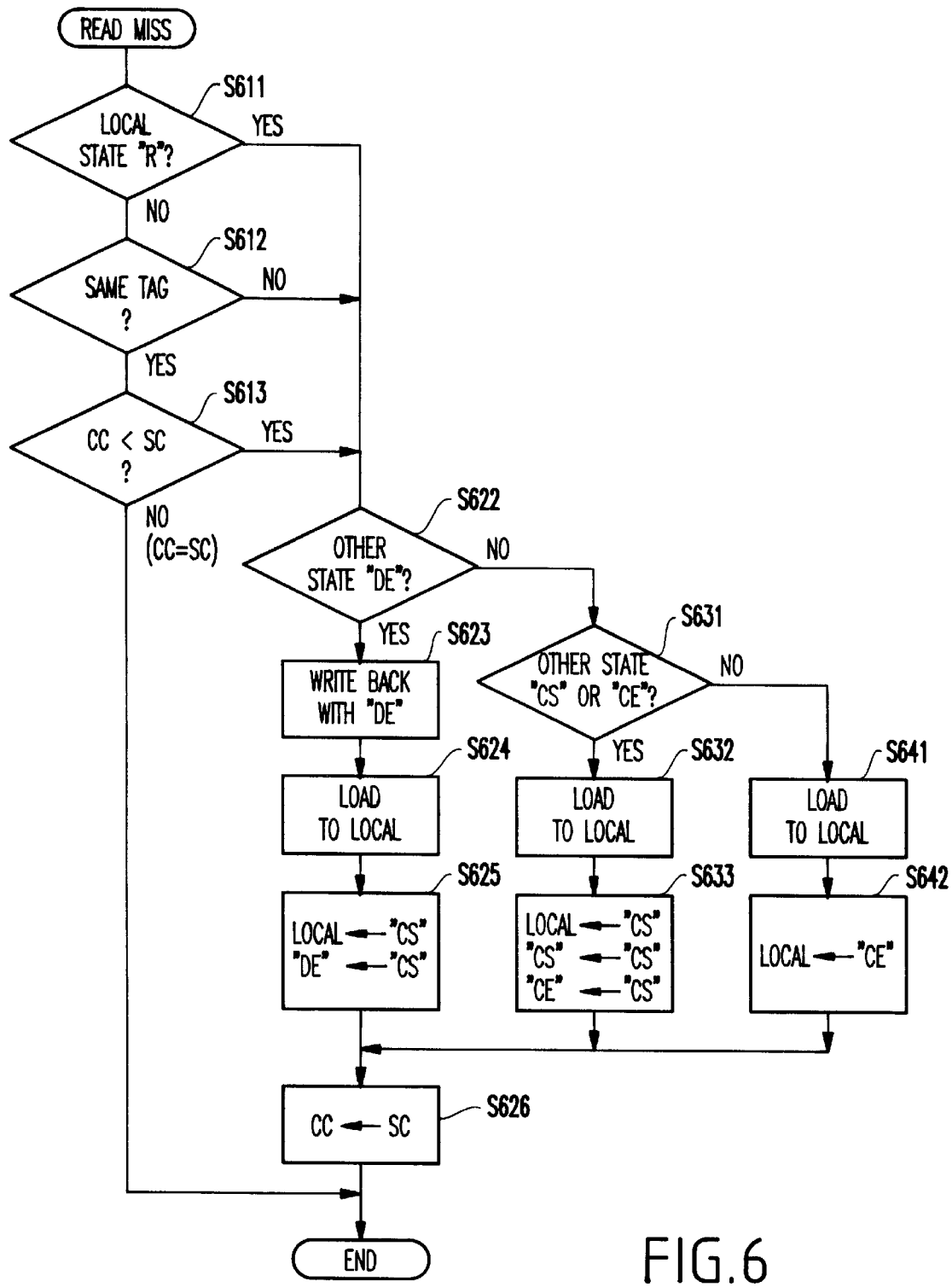
FIG. 6 is a flowchart of a read-miss operation according to a first embodiment of the present invention.

Referring to FIG. 6, a read operation on a cache miss-hit (e.g., a "miss") will be described. First, a cache state 131 of the cache memory 120 (e.g., of the local processor) is checked to determine whether the cache state 131 is under the "R" state (step S611).

In step S611, if the cache state 131 is under the "R" state, then operations begging at step S622 are executed, because the correct (e.g., most recent) data has not yet been entered. Conversely, if the cache state 131 is not under the "R" state, then an address tag in the tag memory (not illustrated) is checked to determine whether an address to be accessed matches the address tag (step S612), because there is a probability that the correct (latest) data is entered.

In step S612, if the address tag does not match, then operations beginning at step S622 are executed, because the required data is not left in the cache memory. If the address tag matches, then the cache synchronization count 132 and the value of the synchronization counter 140 are compared (step S613), because there may be an invalidated data in the cache memory.

In step S613, if the cache synchronization count 132 (CC) is smaller than the value (SC) of the synchronization counter 140, then the operations beginning at step S622 are executed, because the data in the cache memory is non-synchronized data. If the cache synchronization count 132 is equal to the value of the synchronization counter 140, then the data is directly read without conventional cache protocol operations, because the data in the cache memory is synchronized data.

Such a read operation with a simplified cache protocol is one of the features of the first embodiment.

The operations beginning at step S622 are similar to those of the conventional copy-back cache protocol. That is, when any of the cache states in the cache memories of other processing units is in the "DE" state, after the entry with the "DE" state is written back to the memory module 300 (step S623), this entry is loaded from the memory module 300 into the cache memory 120 of its own (e.g., the local) processing unit (step S624).

With respect to the entry loaded on its own processing unit (e.g., the local processing unit) and the entry with the "DE" state among other processing units, the cache state 131 becomes the "CS" state (step S625), and the cache synchronization count 132 (CC) becomes the value (SC) of the synchronization counter 140 (step S626).

When there is no cache state under the "DE" state among the cache memories of the other processing units, if there is a cache state under one of the "CS" state and the "CE" state, then corresponding data is loaded from the memory module 300 into the cache memory 120 of the respective processing unit (step S632). Then, as to the entry loaded on the respective processing unit and the entries under one of the "CS" state and the "CE" state of the other processing units, the cache state becomes the "CS" state (step S633), and the cache synchronization count 132 (CC) becomes the value (SC) of the synchronization counter 140 (step S626).

When there is no cache state which is under the "DE" state among the cache memories of the other processing units, if there is neither the cache state under the "CS" state nor the cache state under the "CE" state, the corresponding data is loaded from the memory module 300 into the cache memory 120 of the respective processing unit (step S641). Then, as to the entry loaded on the respective processing unit, the cache state becomes the "CE" state (step S642), and the cache synchronization count 132 becomes the value of the synchronization counter 140 (step S626).

In a write operation on a cache miss-hit (e.g., a "miss"), the operations are performed by the read operation on a cache miss-hit and the write operation on a cache-hit.

In a read operation on a cache-hit, operations are not affected by the cache states.

Hereinbelow and referring to FIGS. 1, 2, and 7, the timing between the processing units of the multi-processor system in accordance with the above-mentioned first embodiment of the present invention will be described.

Referring to FIG. 7, it is assumed that "0" is substituted for the variable "X" and the cache state is under the "CE" state in the processing unit #1. After a synchronization instruction is executed under this state, when the processing unit #2 refers to the variable "X", the entry containing the variable "X" is loaded into the cache memory of the processing unit #2, so that the cache state thereof becomes the "CS" state. At the same time, the cache state of the entry containing the variable "X" of the cache memory of the processing unit #1 also becomes the "CS" state.

Then, it is now assumed that after the synchronization instruction is again executed, "1" is substituted for the variable "Y" in the processing unit #1. It should be noted that the variable "Y" belongs to the same entry as the variable "X". As a result, the cache state of the processing unit #2 becomes the "I" state (step S512 of FIG. 5), and the cache state of the processing unit #1 becomes the "DE" state (step S515 of FIG. 5).

Figure 11:
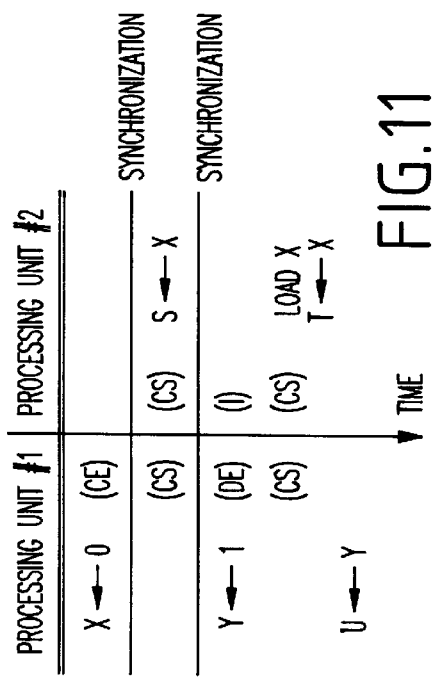
FIG. 11 is a diagram showing a timing of a conventional system.

Referring to FIG. 11, in the conventional protocol, when the processing unit #2 refers to the variable "X" under this state, after the entry of the cache memory of the processing unit #1 is written back to the memory module, such an operation is performed in which this entry is loaded into the cache memory of the processing unit #2.

However, according to the present invention, since the cache synchronization count 132 (CC) is equal to the value (SC) of the synchronization counter 140, synchronization is assured (step S613 of FIG. 6). Consequently, the variable "X" can be read from the entry whose cache state is under the "I" state. Furthermore, when the processing unit refers to the variable "Y", the variable can also be read from the entry under the "DE" state.

As described above, in accordance with the first embodiment of the present invention, the "R" state indicative of the initial state is newly provided as the cache state. Furthermore, the synchronization counter 140 is employed which is incremented every time the synchronization instruction is executed. The cache synchronization count 132 stores the value of the synchronization counter 140. If (1) the cache state is not under the "R" state, (2) the tags match, and (3) the cache synchronization count 132 is equal to the value of the synchronization counter 140, then the cache memory can be accessed with the simplified cache protocol.

Next, a second embodiment of a cache protocol according to the present invention will be described in detail with reference to FIG. 8.

Referring to FIG. 8, in the second embodiment, an operation similar to that of the first embodiment is executed except for the following point. That is, in such an entry which is updated immediately after a read operation on a cache miss-hit (step S621), the corresponding data is loaded from the memory module (step S654), and then the cache state (e.g., of the local cache) becomes the "I" state (step S655). In the second embodiment, a write operation on both a cache-hit and a cache miss-hit, and a read operation on a cache-hit are similar to those of the first embodiment.

The judgement as to "whether or not the entry is updated immediately after" may be clearly defined in the program, or may be analyzed by a compiler.

Hereinbelow and referring to FIGS. 1, 2, and 9, the timing between the processing units of the multi-processor system in accordance with the above-mentioned second embodiment of the present invention will be described.

Figure 9:
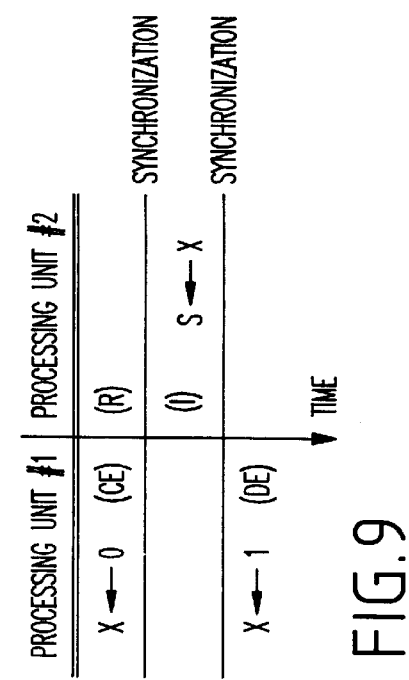
FIG. 9 is a diagram showing a timing of the second embodiment of the present invention.
Figure 12:
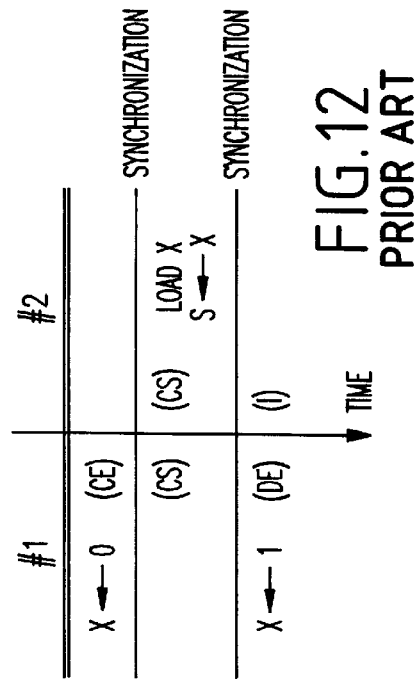
FIG. 12 is a diagram showing another timing of the conventional system.

Referring to FIG. 9, it is assumed that while the cache state 131 for the entry containing the variable "X" of the processing unit #1 is under the "CE" state, there is no entry containing the variable "X" in the cache memory of the processing unit #2 (namely, the "R" state). Under this state, when the processing unit #2 refers to the variable "X", after the corresponding data is loaded into the cache memory, the cache state 131 must be set to the "CS" state in the conventional cache protocol as indicated in FIG. 12.

In contrast, according to the second embodiment, when it is recognized in advance that the variable "X" is updated in the processing unit #1 after the synchronization instruction is executed, the cache state of the processing unit #2 is set to the "I" state (step S655 of FIG. 8). This is because the operation may be processed at high-speed by omitting the intermediate state required by the conventional system as shown in FIG. 12.

That is, even when the cache state becomes the "CS" state, it can be recognized that each cache state would be later invalidated by updating the variable "X" in the processing unit #1. As a result, after "1" is substituted for the variable "X" in the processing unit #1, the cache state of the processing unit #1 becomes the "DE" state, whereas the cache state of the processing unit #2 becomes the "I" state. Thus, the final cache state in the second embodiment of FIG. 9 coincides with that of the conventional cache protocol of FIG. 12.

As described above, in accordance with the second embodiment of the present invention, in addition to the first embodiment, as to such an entry which may be previously updated by other processing units after the next synchronization instruction is executed, this entry becomes the "I" state during the loading of the data. As a result, the intermediate cache state required by the conventional system (see FIG. 12) may be omitted, and therefore the operation can be further executed at high-speed.

In the respective first and second embodiments, the network 200 is assumed to function such that a change of cache state can be instructed from a respective processing unit to all of the remaining processing units at the same time. A common bus and the like may correspond to this sort of a network.

Figure 10:
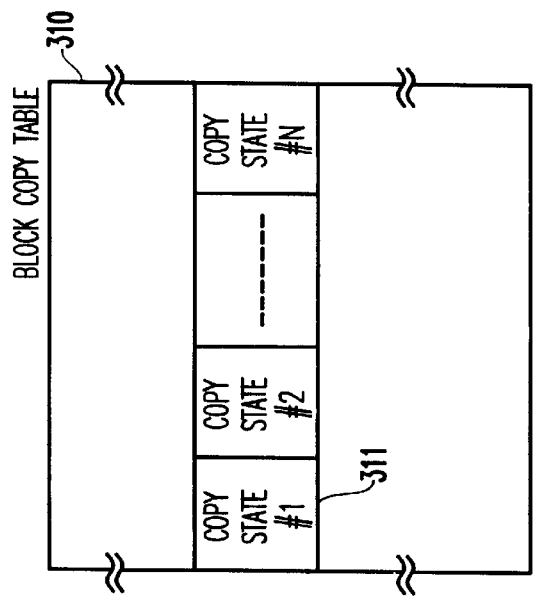
FIG. 10 is a diagram showing a structural example of a block copy table 310 according to the present invention.

Alternatively, the present invention may be applied to other sorts of networks with high-efficiency when the below-mentioned arrangements are employed therein. For example, a block copy table 310 as illustrated in FIG. 10 may be provided with respect to each of the memory modules 300. The block copy table 310 is coupled to each processing unit 100, and stores therein a copy state 311 indicating which cache memory of the processing unit has a copy of the memory module 300 corresponding to each of the entries in the cache memory 120.

That is, when the copy state #1 is equal to "1", this implies that there is a copy in the cache memory within the processing unit #1. When the copy state #2 is equal to "0", it implies that there is no copy in the cache memory within the processing unit #2. As a result, even in such a network where the change of the cache state cannot be instructed from the respective processing unit to all of the other processing units at the same time, the processing unit having the copy of the memory module can be specified with reference to the block copy table 310, and the cache protocol operations can be individually controlled.

As apparent from above, according to the present invention, since the initial state "R" is newly provided as the cache state and the synchronization counter which is incremented every time the synchronization instruction is executed, it is possible to access the cache memory with a simplified cache protocol.

Moreover, as to such an entry which is previously recognized to be updated by the other processing units after the next synchronization instruction is executed, this entry is set under an invalid state when the entry is loaded. consequently, the intermediate cache state may be omitted and a high-speed operation with greater reliability may be achieved.

While the invention has been described in terms of preferred embodiments, those skilled in the art will recognize that the invention can be practiced with modification within the spirit and scope of the appended claims.

What is claimed is:

1. A multi-processor system having a plurality of processing units, at least one memory module, and a network connecting said processing units and said at least one memory module, each of said processing units comprising:
    a cache memory for storing a copy of said at least one memory module; and
    a state memory for storing a synchronization state of said cache memory with regard to other cache memories of said processing units of said multi-processor system,
    wherein said cache memory is available for access if said synchronization state indicates a most recent state,
    wherein said state memory stores a cache state table for storing said synchronization state and a cache state for each entry in said cache memory, and
    wherein said cache state includes one of a plurality of states, said plurality of states including:
        a reset state for indicating that no data has ever been loaded from said at least one memory module to said cache memory;
        an invalid state for indicating that any data has been loaded from said at least one memory module, but that none of said data remains valid; and
        a valid state for indicating that a data is valid.

2. The multi-processor system according to claim 1, each of said processing units further comprising:
    a synchronization counter for counting synchronization among said processing units.

3. The multi-processor system according to claim 2, wherein said synchronization counter provides a value for setting said synchronization state in said cache state table when a corresponding data is loaded from said at least one memory module.

4. The multi-processor system according to claim 3, wherein said cache memory is available for access if said synchronization state coincides with the value of said synchronization counter.

5. The multi-processor system according to claim 1, said valid state comprising:
    a clean exclusive state for indicating that only said cache memory of a respective processing unit in said multi-processor system has a copy of said at least one memory module, and that the copy coincides with a content of said at least one memory module;
    a clean shared state for indicating that other cache memories of said processors of said multi-processor system have copies of said at least one memory module, and the copies coincide with the content of said at least one memory module; and
    a dirty exclusive state for indicating that only said cache memory of said respective processing unit in said multi-processor system has a copy of said at least one memory module, and that the copy does not coincide with the content of the at least one memory module.

6. The multi-processor system according to claim 2, wherein said cache memory is available for access if said synchronization state coincides with the value of said synchronization counter and said cache state indicates said reset state.

7. The multi-processor system according to claim 1, further comprising means for judging, in advance, whether said cache state would be invalidated by a subsequent operation, wherein said cache state is invalidated if said means for judging judges that said cache state would be invalidated by said subsequent operation.

8. The multi-processor system according to claim 1, further comprising means for judging, in advance, whether said cache state would be invalidated by a subsequent operation, wherein said cache state is invalidated if said means for judging judges that said cache state would be invalidated by other processing units after synchronization.

9. The multi-processor system according to claim 1, said network comprising a common bus.

10. The multi-processor system according to claim 1, each of said processing units further comprising:
    a block copy table, coupled to each processing unit and provided with respect to each memory module of said at least one memory module, for storing a copy state indicating which cache memory of other respective processing units has a copy of said at least one memory module corresponding to each of the entries in said cache memory.

11. The multi-processor system according to claim 1, wherein said each entry in said cache memory contains a plurality of words.

12. The multi-processor system according to claim 1, wherein a cache synchronization count is valid even when said cache state has said invalid state.

13. The multi-processor system according to claim 1, wherein a same entry includes different variables.

14. A processing unit connected to a memory module, comprising:

a cache memory for storing a copy of said at least one memory module;

a cache state table for storing a synchronization state of said cache memory, wherein said cache memory is available for access if said synchronization state indicates a most recent state; and a synchronization counter for counting synchronization between said processing unit and a second processing unit to provide a value, said value for setting said synchronization state in said cache state table when a corresponding data is loaded from said at least one memory module, wherein said cache memory is available for access if said synchronization state coincides with the value of said synchronization counter, said cache state table further storing a cache state of said cache memory, wherein said cache state includes one of a plurality of states, said plurality of states comprising:

a reset state for indicating that no data has ever been loaded from said at least one memory module to said cache memory;

an invalid state for indicating that any data has been loaded from said at least one memory module, but that none of said data remains valid; and a valid state for indicating that a data is valid.

15. The processing unit according to claim 14, further comprising means for judging, in advance, whether said cache state would be invalidated by a subsequent operation, wherein said cache state is invalidated if said means for judging judges that said cache state would be invalidated by said subsequent operation.

16. The processing unit according to claim 14, further comprising means for judging, in advance, whether said cache state would be invalidated by a subsequent operation, wherein said cache state is invalidated if said means for judging judges that said cache state would be invalidated by other processing units after synchronization.

17. The processing unit according to claim 14, further comprising:

a block copy table, coupled to said cache memory and provided with respect to each memory module of said at least one memory module, for storing a copy state indicating which cache memory of other respective processing units has a copy of said at least one memory module corresponding to each of the entries in said cache memory.

18. The processing unit according to claim 14, wherein said each entry in said cache memory contains a plurality of words.

19. The processing unit according to claim 14, wherein a cache synchronization count is valid even when said cache state has said invalid state.

20. The processing unit according to claim 14, wherein a same entry includes different variables.

* * * * *